United States Patent [19]

Zufelt et al.

[11] Patent Number: 5,446,448

[45] Date of Patent: Aug. 29, 1995

[54] RIVER ICE MOTION DETECTOR

[75] Inventors: Jon E. Zufelt, Canaan; Charles H. Clark, Enfield, both of N.H.; David S. Deck, Madison, Me.

[73] Assignee: The United States of America as represented by the Secretary of the Army, Washington, D.C.

[21] Appl. No.: 224,417

[22] Filed: Apr. 8, 1994

[51] Int. Cl.$^6$ .................................................. G08B 21/00
[52] U.S. Cl. ........................... 340/580; 73/170.26; 374/323; 340/540; 340/601
[58] Field of Search ............. 340/601, 580, 540; 73/170.26; 324/323

[56] References Cited

U.S. PATENT DOCUMENTS

| | | | |
|---|---|---|---|
| 2,902,669 | 9/1959 | Lucarelli | 340/601 |
| 3,477,019 | 11/1969 | Hartmann | 324/323 |
| 3,696,679 | 10/1972 | Peterson et al. | 340/590 |
| 3,894,427 | 7/1975 | Schuermann et al. | 73/781 |
| 4,680,961 | 7/1987 | Grauman et al. | 340/601 |
| 4,978,947 | 12/1990 | Finnegan | 340/611 |
| 5,177,468 | 1/1993 | Baldwin et al. | 340/540 |

Primary Examiner—Glen Swann
Attorney, Agent, or Firm—Luther A. Marsh

[57] ABSTRACT

A river ice motion detector system for detecting ice run conditions in order to warn communities downstream that flooding from ice jams is possible, comprises a voltage source, a multi-meter, a detector unit and a plurality of sensor loops, all having communication with each other. The voltage source provides an input signal to the detector unit and then to the sensor loops. The sensor loops provides a second signal back to the multi-meter in response to the input signal. The detector unit has a plurality of resistors and a plurality of switches, the values of the resistors determined providing large step differences, allowing the detector unit to determine which of the sensor loops is broken indicating a possible ice run. The switches are normally closed, providing a test for the system when the switches are deliberately opened.

4 Claims, 2 Drawing Sheets

RIVER ICE MOTION DETECTOR

STATEMENT OF GOVERNMENT INTEREST

The invention described and claimed herein may be manufactured and used by or for the Government of the United States of America for governmental purposes without the payment of royalties thereon or therefor.

FIELD OF THE INVENTION

The present invention relates to a detector that determines when a river ice run has begun. A river ice run is when the ice on a river begins to melt, breaks and runs downstream. River ice runs can cause ice jams that lead to flooding. Based on river characteristics and the location of the ice motion detector, the knowledge that an ice run has begun can be utilized to warn communities downstream that flooding from ice jams is possible. The advanced warning would allow communities to evacuate floodprone areas, close bridges, and mobilize flood fighting efforts in a timely manner.

DESCRIPTION OF PRIOR ART

There are two current methods of river ice motion and ice run detection. The first relies on visual observations of river watchers. This is usually accomplished by one or a series of individuals who have some knowledge of river ice processes and who must make visual inspection tours of the river in question. The frequency of these observations may range from infrequent weekly visits during mid-winter to around-the-clock watches as spring approaches. Due to the inaccessibility of many rivers and the length of the river to be observed, aerial surveys may often be necessary. Direct river observations can therefore become very costly with coverage limited due to manpower and economic constraints. River ice runs can occur very suddenly and thus may go undetected until the ice jams and flood waters rise.

The other current method of ice run detection requires a thorough knowledge of river ice processes and the hydraulic and hydrologic characteristics of the river basin in question. Mid-winter field observations of the river provide estimates of thickness and ice strength. Coupled with knowledge of the response of the river to precipitation and snow melt, rough estimates of the probability of river ice breakup can be made. This method is impractical for most communities due to the requirement of a trained engineer or scientist. The method also relies on good air temperature and precipitation forecasts and at best can only provide estimates that conditions are suitable for river ice breakup. This method is often used to determine when to send river observers into the field and often results in false alarms or undetected breakups.

In conjunction with both methods, recording water stage gages can also be monitored on a near real-time basis with rapid rises in stage signalling possible ice breakup. While stage gages can provide better information on stage rises, they provide no information on ice movement. Depending on river characteristics and ice strength, rapid stage rises may or may not induce ice breakup or movement resulting in possible false alarms or undetected ice runs.

SUMMARY OF THE INVENTION

It is the primary object of the invention to determine when a river ice run has begun by utilizing a river ice motion detector system comprising a voltage source, a multi-meter, a detector unit, and sensor wires that are all in communication with each other.

It is also an object of this invention to determine where on the river the ice has broken and to warn communities downstream that flooding from ice jams is possible.

It is further an object of this invention to be able to test the present invention once the sensor wires have been installed into the ice cover by using switches that simulate breaking the circuit as if there were an ice run breaking the sensor wires.

DESCRIPTION OF THE PREFERRED EMBODIMENT

Figure 1:
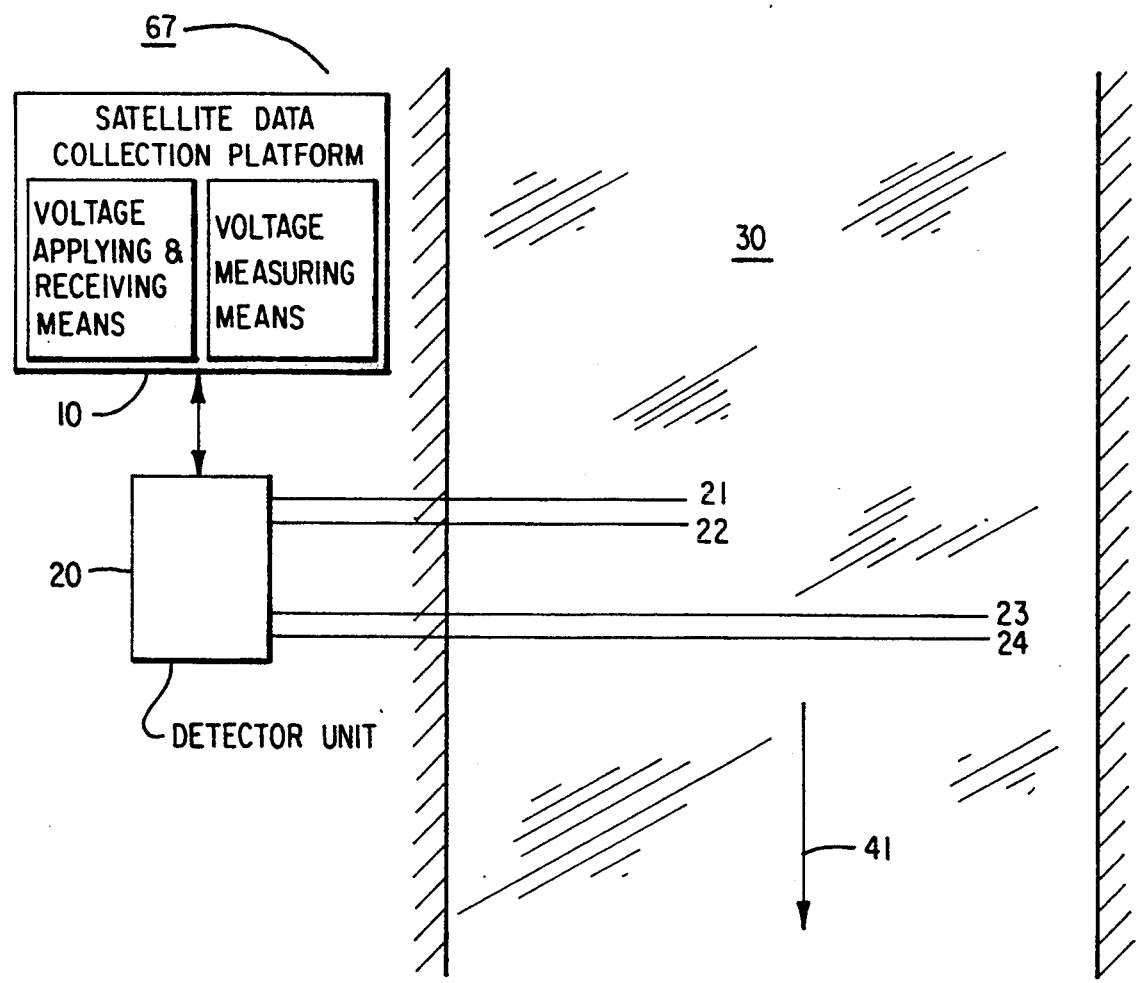
FIG. 1 is a diagrammatical representation of the preferred embodiment of the present invention showing the manner in which the essential components are configured.
Figure 2:
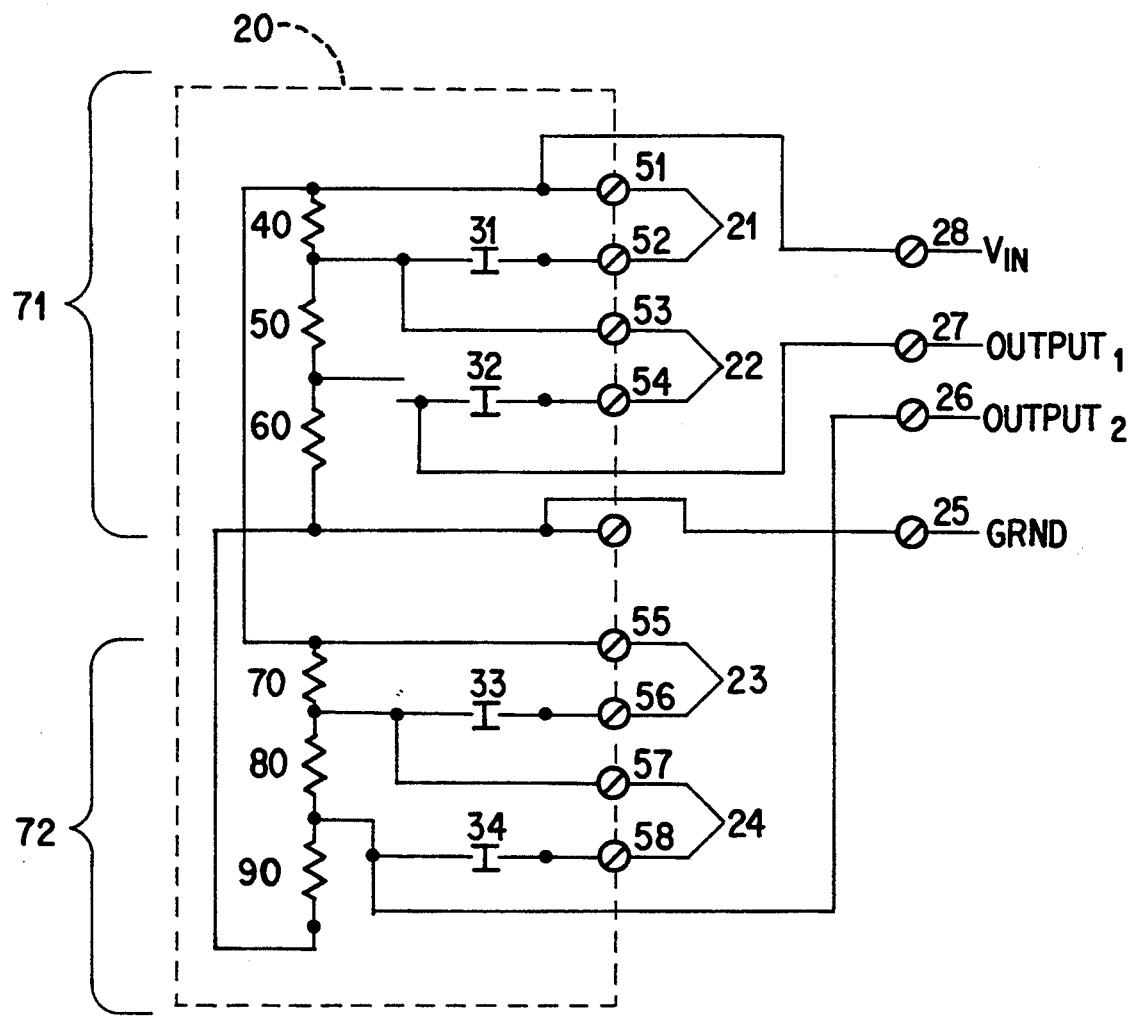
FIG. 2 is a schematic of the present invention showing the wiring and electrical arrangement of parts in the present invention.

The river ice motion detector system 67 depicted in FIG. 1 comprises a Satellite Data Collection Platform (DCP) 10, a detector unit 20, and two pairs of sensor loops 21/22 and 23/24 placed into the ice cover 30. The DCP provides a voltage source and a multi-meter which has standard metering capabilities measuring or reading AC and DC current, resistance, and frequency. In this embodiment, the DCP provides direct current voltage source input to the detector unit 20. In the preferred embodiment, a 5 volt direct current (5 VDC) power source is used. This value is arbitrarily chosen, other values may be used. Voltage input 28 passes through the detector unit 20 and then through two pairs of sensor loops 21/22 and 23/24 which then provide a signal back to the DCP 10. In this embodiment, a sensor loop is a pair of wires connected and fused at one end. These wires are from about sixteen to about twenty-two gauge wire. The wires are fused together such that breakage will occur at a pre-defined location in the loop, reducing the chance that the two broken ends will re-contact each other. As seen in FIG. 2, wires 51 and 52 are fused together forming sensor loop 21. Wires 53 and 54 fused together forming sensor loop 22. Wires 55 and 56 are fused together forming sensor loop 23. Wires 57 and 58 are fused together forming sensor loop 24. More than two pairs of sensor loops may be used to accomplish detection of an ice run, two pairs of sensor loops were chosen arbitrarily here.

The detector unit 20 is the interface between the DCP 10 and the two pairs of sensor loops 21/22 and 23/24. Each pair of sensor loops provides an analog signal back to the DCP 10 providing redundancy in the system and reducing the likelihood of false indications of ice breakup. The level of the analog signal is determined by the integrity of the electrical circuit through each pair of sensor loops. The 5 VDC input 28 is passed through a plurality of resistors and the signal is altered depending on whether one, the other, or both sensor loops in each pair has broken, indicating ice movement.

In the preferred embodiment, there are two legs of the circuit, leg 71 and leg 72: loops 21 and 22 encompass the first leg 71; and loops 23 and 24 are the second leg 72. Because it is often difficult to predict exactly where the ice cover 30 will break up, the sensor loops of the first leg 71 and second leg 72 are placed at two different places across the ice cover 30. This technique allows one to remotely determine if the entire ice cover 30 is in the process of breakup or merely undergoing some minor movement in one area. In this embodiment, loops 21 and 22 are positioned horizontally, in slots, about mid-channel in the ice cover 30 while the other loops 23 and 24 positioned horizontally, in slots, about halfway between the shoreline and the first pair of loops 21 and 22. Each slot housing a sensor loop is refilled with ice and snow and allowed to refreeze having the sensor loops encased therein. If ice movement occurs in the mid-region of the ice cover 30, the sensor wires will be broken, opening leg 71 of the circuit. If ice movement occurs in the far-region of the ice cover 30, the sensor wires will be broken opening leg 72 of the circuit. The position of the sensor loops is chosen so that an ice run can be detected at various locations on the ice cover 30. The aforementioned positions are arbitrarily chosen, the sensors may be located at places other than those mentioned here to detect an ice run.

In this embodiment, the resistors have arbitrarily chosen values which have resistance providing large step differences in voltage so that it is easy to determine from the detector unit 20 which of the loops has broken. Resistor values, other than those chosen, may be used as long as relatively large step differences in voltage exist. The resistors in the present invention have values as follows: resistor 40 is about 4.7K; resistor 50 is about 2.2K; resistor 60 is about 2.2K; resistor 70 is about 4.7K; resistor 80 is about 2.2K; resistor 90 is about 2.2K. Resistor 40 is in parallel with loop 21. Resistor 50 is in parallel with loop 22. Loops 21 and 22 are in series with each other. Resistor 60 is connected to resistor 50 and to common ground 25. Resistor 70 is in parallel with loop 23. Resistor 80 is in parallel with loop 24. Loops 23 and 24 are in series. Resistor 90 is connected to resistor 80 and to common ground 25.

Each loop is connected to a switch: loop 21 is connected to switch 31; loop 22 is connected to switch 32; loop 23 is connected to switch 33; loop 24 is connected with switch 34. These switches are normally closed and are open only to test the circuit to make sure that it is functioning. When a switch is open, it simulates what happens when an ice run breaks a sensor wire, essentially breaking the circuit, in that particular loop.

When the first leg of the circuit 71 is intact, meaning when both sensor wires 21 and 22 are intact, the analog signal to the DCP 10 is about 4.95 VDC. When only loop 21 is open, the signal to the DCP is about 1.86 VDC. When loop 22 is open, the signal to the DCP 10 is about 2.58 VDC. When loops 21 and 22 are open, the signal to the DCP 10 is about 1.40 VDC.

By monitoring the signals 26 and 27 from the detector unit 20 through a DCP or similar device, one can determine in almost real time when the ice cover begins to break up. Dissemination of this information through existing communications networks provides time for communities downstream to initiate evacuation, flood preparation, or ice breaking operations. This advanced warning should reduce damages to property and improve the effectiveness of flood-fighting efforts.

The advantages of the present invention has several advantages over the currently used methods: (1) it provides a definite indication of ice cover breakage and movement, not relying on extensive scientific knowledge of the river basin and ice processes; (2) it provides around the clock monitoring of the ice cover at very minimal operating or maintenance costs; (3) installation of the unit is accomplished during mid-winter when the ice cover is stable and safe on which to work; (4) installation is quick and easy, about two to three hours with manually powered equipment; (5) the system can be tested after installation by use of the switches on the detector unit; (6) redundancy in the system reduces the chance of false alarms; and (7) the system provides near real time indication of ice cover movement, allowing maximum notification time to communities downstream.

The description of the preferred embodiment is only one of many configurations of the system. The voltage source could be any readable constant DC voltage supply and any combination of resistors could be used to give distinct outputs in order to detect whether and when any sensor loop has been broken. The instrument used for reading the analog signal would typically have a switchable DC voltage supply which could be conveniently used. As an alternative, the resistance of the sensor loop circuit could be read instead of voltage. The number of sensor loop pairs is only limited by the number of analog input channels available on the reader or multi-meter. At a minimum, one pair could be used, with each sensor placed at a different location across the river, eliminating the redundancy of sensor loop pairs described above. There are also many configurations of signal reader and transmitter. A data logging instrument could read the data and then relay the information by telephone to the communities downstream either actively (data logger auto dialing the community) or by inquiry (community calling the data logger). Where telephone lines do not exist, radio transmission or cellular telephone systems could be used instead of the satellite system described above.

What is claimed is:

1. A river ice motion detector system for detecting ice run conditions in order to warn communities downstream that flooding from ice jams is possible, comprising;

means for receiving and applying a voltage, means for measuring a voltage output, a detector unit and a plurality of sensor loops all having communication with each other;

said voltage applying means providing an input signal to said detector unit and then an input signal to said sensor loops;

said detector unit consisting of a plurality of resistors and a plurality of switches;

said sensor loops, positioned horizontally in slots in an ice cover, providing a second signal back to said voltage measuring means in response to said input signal;

said slot being refilled with ice and snow to allow refreezing having said sensor wires enclosed therein; wherein said sensor loops upon breaking, open the circuit when the ice cover begins to break up;

each of said sensor loops consists of two wires fused together permitting breakage to occur at a predefined location in said loop;

each of said loops is in communication with one of said switches;

said switches are normally closed, providing a test for the system when said switches are deliberately opened; and said resistors have resistances providing large step differences, allowing said detector to determine which of said loops has broken.

2. The system defined in claim 1, wherein, said means for receiving and applying a voltage and said means for measuring a voltage further comprises a Data Collection Platform.

3. The system defined in claim 1, wherein said wires are between about sixteen to about twenty-two gauge.

4. The system defined in claim 1, wherein said sensor loops are positioned in interval locations across the ice to detect which portion of the ice cover is breaking up.

* * * * *